United States Patent
Ivanov et al.

(10) Patent No.: US 12,271,461 B2
(45) Date of Patent: Apr. 8, 2025

(54) DYNAMIC MOUNTING OF TRUSTED CERTIFICATES INTO FUNCTION EXECUTION ON A CONTAINERIZED ENVIRONMENT

(71) Applicant: VMware, Inc., Palo Alto, CA (US)

(72) Inventors: Angel Ivanov, Sofia (BG); Vesela Popova, Sofia (BG)

(73) Assignee: VMware LLC, Palo Alto, CA (US)

( * ) Notice: Subject to any disclaimer, the term of this patent is extended or adjusted under 35 U.S.C. 154(b) by 462 days.

(21) Appl. No.: 17/864,638

(22) Filed: Jul. 14, 2022

(65) Prior Publication Data
US 2024/0020373 A1 Jan. 18, 2024

(51) Int. Cl.
*G06F 21/33* (2013.01)
*H04L 9/40* (2022.01)

(52) U.S. Cl.
CPC ........ *G06F 21/335* (2013.01); *H04L 63/0823* (2013.01)

(58) Field of Classification Search
CPC ............................ G06F 21/335; H04L 63/0823
See application file for complete search history.

(56) References Cited

U.S. PATENT DOCUMENTS

| | | | | |
|---|---|---|---|---|
| 10,298,577 B1* | 5/2019 | Aithal | ................. | G06F 9/45558 |
| 11,151,253 B1* | 10/2021 | Hanafee | .............. | H04L 63/0823 |
| 2013/0031371 A1* | 1/2013 | McLellan | ............. | G06F 21/575 |
| | | | | 713/182 |
| 2015/0379259 A1* | 12/2015 | Mohammed | ............ | H04L 63/08 |
| | | | | 726/6 |
| 2017/0187540 A1* | 6/2017 | Stopel | ................. | H04L 63/1433 |
| 2017/0249128 A1* | 8/2017 | Fojtik | ....................... | G06F 8/71 |
| 2019/0347406 A1* | 11/2019 | Lev-Ran | ................. | G06F 21/51 |
| 2021/0334404 A1* | 10/2021 | Wang | .................... | H04L 63/123 |
| 2022/0078033 A1* | 3/2022 | Bysani Venkata Naga | ................. | |
| | | | | G06F 9/54 |
| 2023/0088927 A1* | 3/2023 | Mukherjee | ............ | H04L 9/3226 |
| | | | | 713/168 |

* cited by examiner

*Primary Examiner* — David J Pearson
(74) *Attorney, Agent, or Firm* — King Intellectual Asset Management

(57) ABSTRACT

Dynamic supply of trusted certificates to a containerized environment by mounting a directory into a container image can be implemented as computer-readable methods, media and systems. The directory stores trusted certificates related to a tenant account at a platform system. The trusted certificates include user specific trusted certificates relevant for authentication at an external system and default certificates relevant for an operating system running at a containerized runtime environment of the tenant account. The trusted certificates are used during execution of functions requested by a user of the tenant account. A function that is defined for a tenant account is executed at a container instantiated at the containerized runtime environment of the platform system. The function dynamically uses the trusted certificates maintained at the directory that is mounted at the containerized runtime environment, where at least one of the trusted certificates is used for authentication at the external system.

20 Claims, 3 Drawing Sheets

DYNAMIC MOUNTING OF TRUSTED CERTIFICATES INTO FUNCTION EXECUTION ON A CONTAINERIZED ENVIRONMENT

BACKGROUND

This specification relates to function-as-a-service capabilities provided by a platform system to execute functions in containerized runtime environments that rely on authorization credentials to access external resources.

Software applications or services can provide services and access to resources on the network. In some cases, access to resources may be restricted based on authorization rights and may require user specific credentials and/or certificates.

SUMMARY

This specification describes technologies related to executing functions in containerized environments that utilize user specific certificates to access external systems. The platform can execute the functions on instantiated containers. The described technologies support dynamic mounting of a directory that includes trusted certificates related to a tenant account of the platform, where the trusted certificates are relevant for execution of a function requested by a user of the tenant account in a container on the platform system.

In some implementations, a container can be defined for execution of a function to provide a lightweight, standalone, executable package of software including logic of a requested function as well as other necessary resources, for example, system libraries, metadata, tools, and runtime.

In some instances, users can develop functions and deploy these functions on pre-prepared images in container form on a platform system that supports function-as-a-service capabilities. A directory including user specific certificates relevant to a tenant account and default operating system certificates is mounted into an instantiated container where a function related to the tenant account is running. The running function can rely on certificates dynamically supplied at the mounted directory.

In particular, this specification describes an automated way of obtaining certificates from users and plugging them into container-based environments where functions that rely on such certificates are running. The obtained certificates are maintained in a local directory at the platform system and are dynamically supplied to the functions during runtime.

Particular embodiments of the subject matter described in this specification can be implemented so as to realize one or more of the following advantages.

Users can provide user specific trusted certificates for use when executing functions in a containerized runtime environment. The certificates can be maintained in a bundle that is generated and maintained up-to-date when new certificates from users are provided. Users can run functions in containerized runtime environments that mount directories maintaining trusted certificates bundled for a particular tenant account associated with the users. The runtime environments do not need to be restarted or re-instantiated to rely on the current newest set of certificates for executing functions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for dynamically supplying user specific trust certificates related to tenant accounts defined at a platform system to services running in immutable containers without rebuilding the immutable containers. The maintained trusted certificates are related to execution of functions on the platform system in containerized format. The platform system can provide function-as-a-service (FaaS) capabilities allowing end users to develop, run, and manage applications, service, or functions, among other example of entities including application functionalities, without the complexity of building and maintaining the infrastructure associated with developing and releasing an application. The trust certificates can be provided to the container images by mounting directories that maintain and manage the trust certificates and their lifecycle.

In accordance with at least some implementations of the present specification, functions (or entities including application functionalities) can be executed in a containerized environment and use the trusted certificates maintained at the platform system to perform implemented logic and to access external resources provided from an external system to the platform system. In some implementations, the functions can be run as Docker container images on the platform system. The platform system can be a cloud platform system or an on-premises system providing one or more of development, deployment, runtime, and data management services, among other platform services to end users.

In accordance with the implementations of the present specification, an orchestrator of the platform system supports mounting of directories including trusted certificates into containers where functions are executed and where the implemented logic at the functions rely on the trusted certificates for authentication at one or more external systems provides multiple technical benefits.

Since the certificates are maintained in directories locally stored at the platform system, the certificates are seamlessly integrated into the execution of functions in the containerized environment. Any updates to the certificates can be reflected during execution of the functions without the need to re-instantiate or restart a container that uses certificates from a directory that has its content updated. Such techniques improve timeliness of function execution as well as reduce resource expenditures for maintaining up-to-date supply of certificates into containerized environments running on the platform system.

Figure 1:
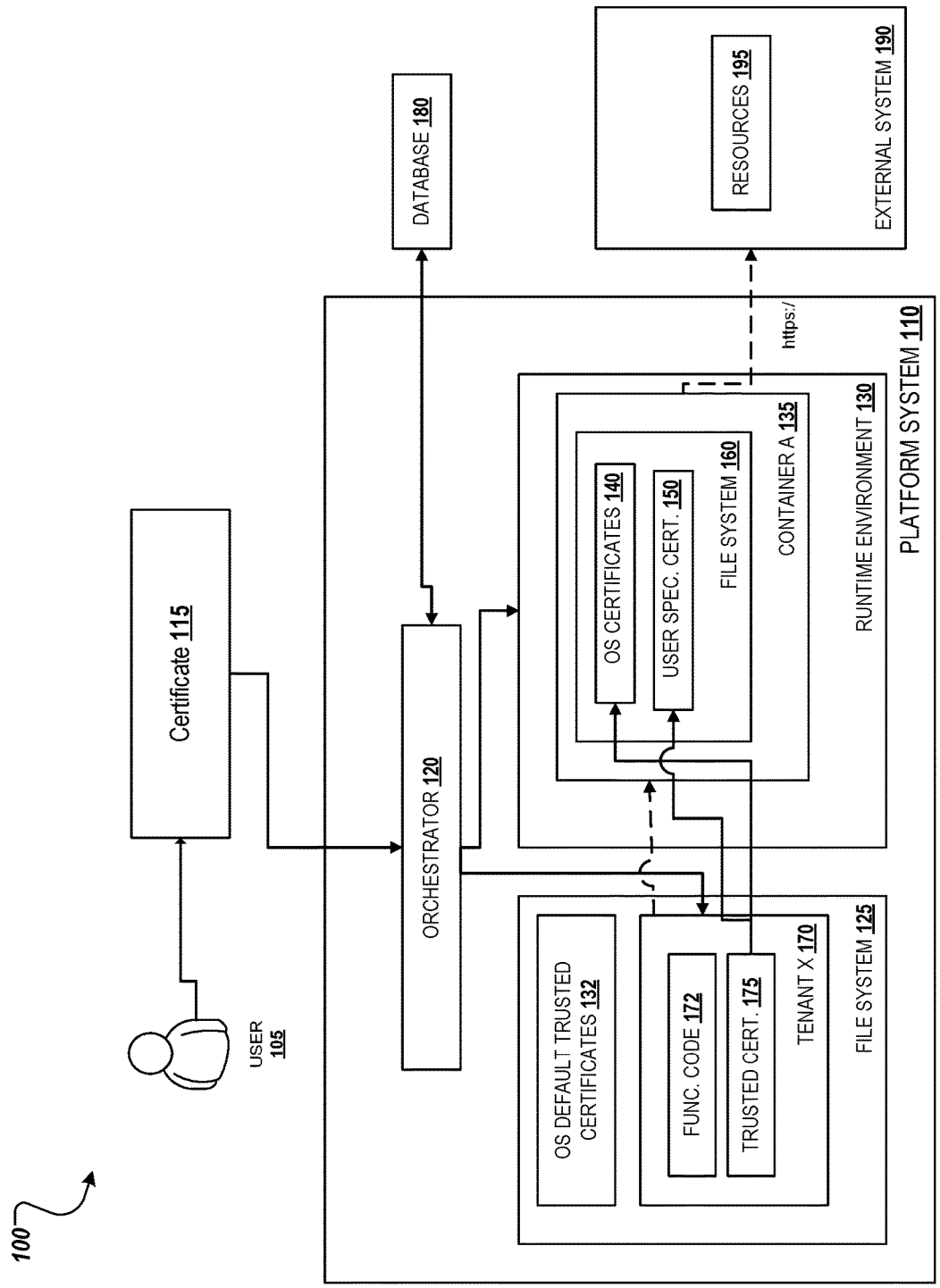
FIG. 1 is a schematic diagram illustrating an example computing environment that supports dynamic supply of trusted certificates to be used during execution of functions in a containerized runtime environment.

FIG. 1 is a schematic diagram illustrating an example computing environment 100 that supports dynamic supply of trusted certificates to be used during execution of functions in a containerized runtime environment.

The computing environment 100 includes a platform system 110 that is communicatively coupled with a database 180 and an external system 190. The platform system 110 can support FaaS capabilities to allow users to develop and run their own functions and rely on the build and deploy capabilities of the platform system 110. The platform system 110 can support execution of FaaS functions on different types of infrastructures. For example, the FaaS functions can be deployed and run on virtual appliances deployed on the platform system 110.

The platform system 110 can store source code related to implemented functions by tenants of the platform system in the database 180. The external system 190 can provide resources 195 that can be consumed by executed functions on the platform system 110.

In some implementations, a user 105 can request through an orchestrator 120 to execute a function, for example, a user developed function or a function that has source code stored at the database 180, in a container A 135 instantiated at the runtime 120. The requested function during runtime can access the external system 190 to consume resources 195. For example, a function that runs on a container may send a call to an external application programming interface (API) of another external system, such as the external system 190, over the network. In some instances, the external system 190 can be accessed over an HTTPS protocol. In some instances, the external system 190 can require certificates to authenticate requests for providing access to the resources 195. The external system 190 may require certificates that are issued from an untrusted authority for the platform system 110 or may be self-signed certificates that may not be directly available to the platform system 110 and inherently to the container where the function accessing the external system 190 is running.

In some implementations, the user 105 provides a certificate 115 that is a user specific certificate that is relevant for executing one or more of the functions defined for the tenant account corresponding to the user 105. The platform system 110 maintains certificates for different tenant accounts on a file system 125 of the platform system.

A directory storing trusted certificates related to a tenant account X of the user 105 can be mounted into the container A 135 to provide dynamic access to trusted certificates relevant for tenant X and the execution of the function at the container A 135. By mounting the directory with the trusted certificates rather than directly providing the certificates, timeliness of function execution is improved. In cases where certificates are provided directly to a container rather than mounted in accordance with the present disclosure, any change in the certificates may mean that a new container image that includes the newest certificates should be built. Building new containers can be time consuming and may be inefficient for the processing power consumption of the platform system 110.

In some implementations, the tenant X directory 170 is a directory including information and data for tenant X on the file system 125. In some implementations the tenant X directory 170 includes trusted certificates 175 maintained for tenant account X. For example, the user 105 can provide certificate 115 that upon processing by the orchestrator 120 can be stored at the tenant X 170 directory at the trusted certificates 175. The trusted certificate 175 folder can include both user specific certificates, such as the certificate 115 provided by user 105, as well as default certificates relevant for the operating systems where the functions would be executed. The platform system 110 maintains OS default trusted certificates 132 at the local file system 125, and those (or a part of them that is relevant) can be provided to the trusted certificate 175 folder. The trusted certificate 175 folder can maintain a bundled file that includes default certificates and user specific certificates, and the folder can be mounted into the container A 135. The file system 160 of container A 135 can include two folders—OS certificates 140 and user specific certificates 150—that reference the corresponding sets of certificates from the mounted trusted certificate 175 directory at the file system 125.

The tenant X 170 directory also includes function code 172 associated with the execution of a requested function. The orchestrator 120 can provide the function code 172 at the tenant X 170 directory when the user 105 requested execution of a function. The orchestrator 120 can process the request from the user 105 and obtain the function code from the source code maintained at the database 180 and provide that function code to the function code 172 directory at the local file system 125 of the platform system.

In some implementations, based on maintained trusted certificates 175 and the function code 172 at the tenant X 170 directory, the orchestrator 120 instantiates the container A 135 at the runtime environment 130. For example, the container A 135 is instantiated on a pre-prepared image for running containers at the platform system 110. The container A 135 mounts the directory 175 with the trusted certificates. The trusted certificate 175 directory can be substantially similar to the described maintained directory at 210 of FIG. 2 below, and as described in relation to FIG. 3.

In some implementations, the file system 125 of the platform system maintains operating system default trusted certificates 132 that can be relevant for operating systems running on images where containers are to be instantiated for executing requested functions through the orchestrator 120.

In some implementations, the platform system 110 can receive and handle requests from users of different tenant account to execute different functions. In such way, the platform system 110 can support multitenant functionality that provides improved efficiency while maintaining data isolation and data privacy. The maintained trusted certificates as well as function code for different tenant accounts can be maintained in isolation from one another.

In some cases, different sets of functions can be maintained for different tenant accounts, however, in some cases, an overlap between functions of different tenant accounts can be maintained. For example, stored source code for a function can be used for running on different containers associated with different tenant accounts and relying on different sets of trusted certificates.

In some implementations, if the user 105 (or another user) of the tenant account provides a new certificate or changes a certificate at the directory of trusted certificates 175, the new or different certificate would be used during the execution of the function running at the container A that has the directory 170 already mounted.

In some implementations, once the orchestrator 120 receives a certificate, such as certificates 115, from the user 105, the orchestrator 120 can parse the certificates and obtain data for the certificates including data for the expiry of the certificate. The orchestrator 120 can locally store metadata for obtained certificates and evaluate on predefined intervals the certificates to determine whether one or more of the maintained certificates at the file system 125 of the platform system 110 is to expire soon. For example, a threshold value for a lapsed period of life of a certificate can be defined to trigger a notification that a certificate is soon to expire. The orchestrator 120 can expose notifications on a user interface of the orchestrator 120 or of the platform system 110 to communicate with users of tenant accounts defined at the platform system 110 and send notifications or alerts for expiration of certificates. For example, if a certificate is soon to expire, and a user is notified, the user may provide a renewed certificate to the platform system that can be plugged into the relevant directory storing trusted certificates.

Figure 2:
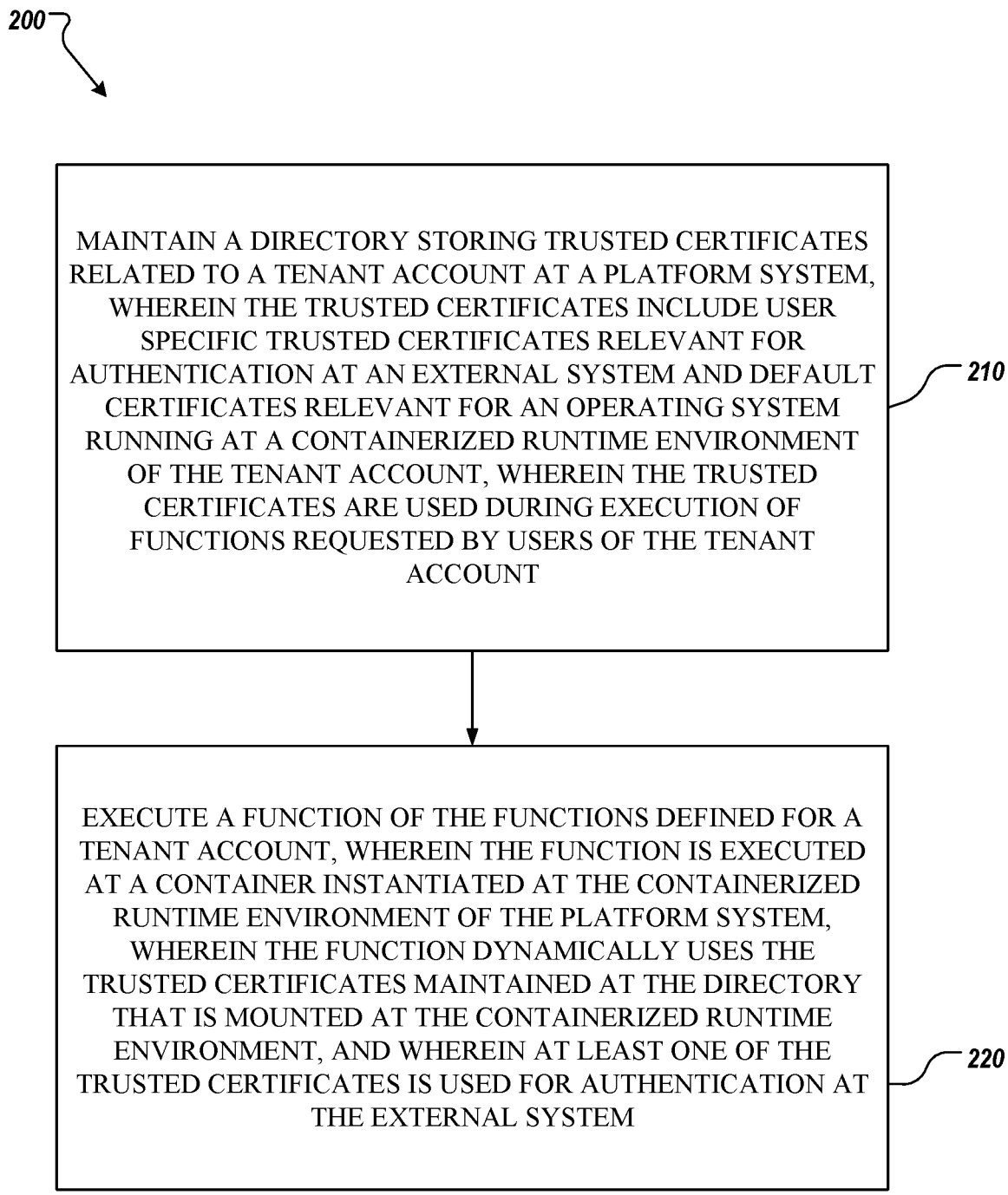
FIG. 2 is a flowchart of an example process for dynamically supplying up-to-date trusted certificates for use during execution of a function in a containerized runtime environment.

FIG. 2 is a flowchart of an example process 200 for dynamically supplying up-to-date trusted certificates for use during execution of a function in a containerized runtime environment. In some implementations, the example process 200 can be executed by a system implementing the example computing environment 100 of FIG. 1.

In some implementations, the example process 200 is executed on a platform system similar to the platform system 110 of FIG. 1, where the platform system provides functionality to execute functions defined by customers and to persist and manage trusted certificates relevant for the execution of functions requested by users of a tenant account defined at the platform system. In some implementations, the platform system may support multitenancy by organizing storage of certificates in separate distinct locations related to different tenant accounts.

In some implementations, the platform system includes an orchestrator that handles requests for executing functions in containerized environments on the platform system and manages trusted certificates provided directly from users and relevant for executing operations part of the defined functions. For example, a user requests a function for accessing an external system, where the external system requires authentication to provide access to resources. In this example, the user can provide user specific certificate(s) relevant for the authorization at the external system. In accordance with the implementations of the present specification, the orchestrator manages the certificates by locally storing them at the platform system and referencing them into a container instantiated for execution of the function.

At 210, an orchestrator of the platform system maintains trusted certificates related to a particular tenant account at a directory. The trusted certificates include user specific trusted certificates relevant for authentication at an external system and default certificates relevant for an operating system running at a containerized runtime environment of the tenant account. The trusted certificates are used during execution of functions requested by users of the tenant account. The functions can be executed in the containerized environment instantiated at the platform system.

In some implementations, the orchestrator can create the directory at a local file system at the platform system. In some implementations, the local file system can store one or multiple directories, where different directories are designated to different tenant accounts.

The maintained directory, at 210, is designated to the tenant account from a plurality of tenant accounts maintained at the platform system.

Figure 3:
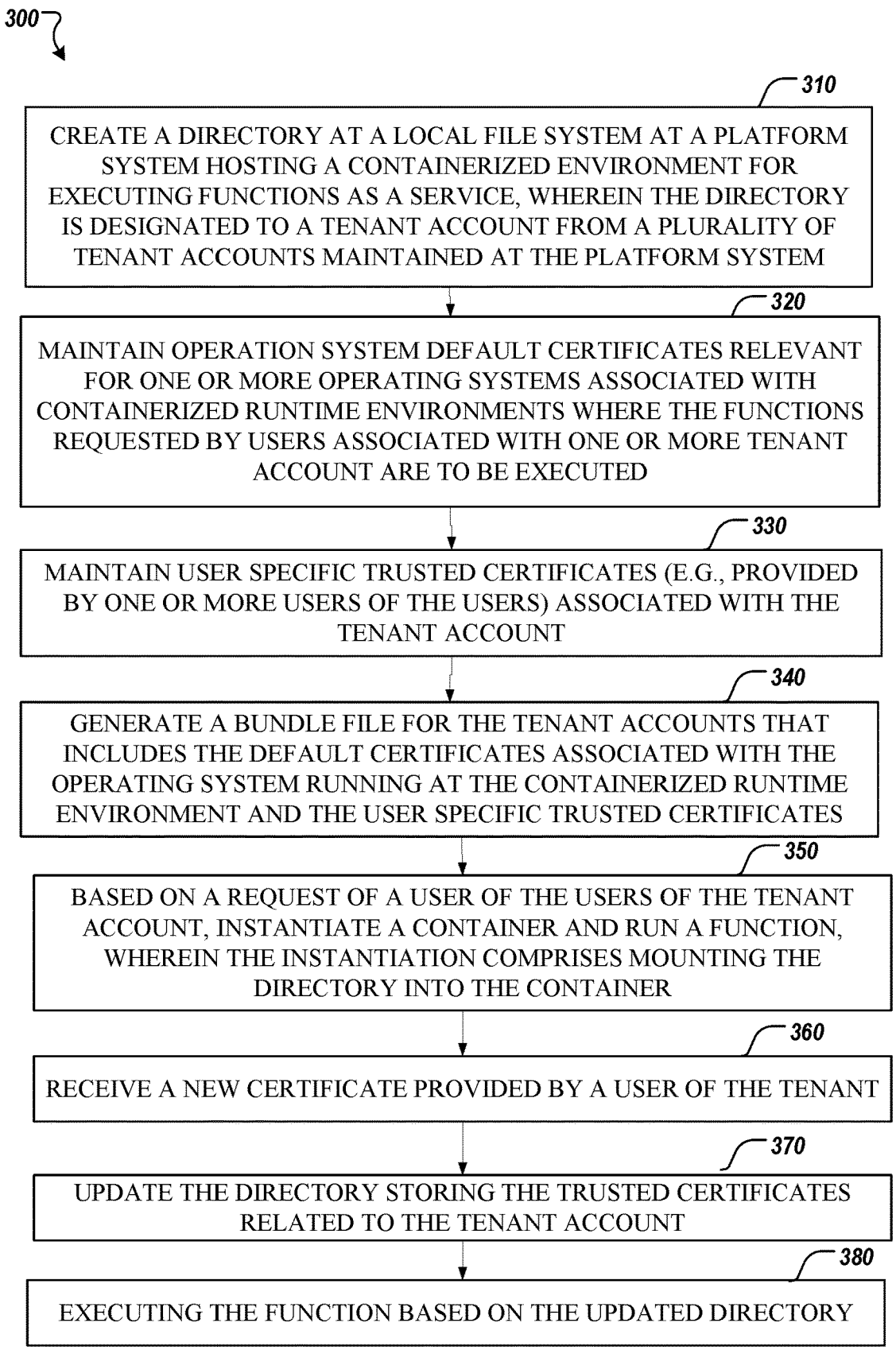
FIG. 3 is a flowchart of an example process for preparing and maintaining a bundle of certificates for a tenant account associated with running functions on containers instantiated in a platform runtime environment.

In some implementations, the maintained directory can be created to include the user specific trusted certificates and the default operating system certificates as described in relation to FIG. 3.

In some implementations, the local file system of the platform system stores operating system default certificates relevant for one or more operating systems associated with containers instantiated at the containerized runtime environment provided at the platform system. A user can request a function, for example, a newly developed function, or a function that is defined for the tenant account that corresponds to the user, to be executed on a container that is instantiated at the containerized runtime environment provided by the platform system.

In some implementations, the platform system can be associated with a source code database, for example, the source code database 180 of FIG. 1, to acquire source code related to functions requested by users for execution.

At 220, a user requested function of the functions associated with a tenant account is executed at a container. The orchestrator instantiates the container at the containerized runtime environment of the platform system. The function dynamically mounts the directory where the trusted certificates are maintained to use the trusted certificates for authentication at the external system.

FIG. 3 is a flowchart of an example process 300 for preparing and maintaining a bundle of certificates for a tenant account associated with running functions on containers instantiated in a platform runtime environment. In some implementations, the example process 300 can be executed by a system implementing the example computing environment 100 of FIG. 1.

In some implementations, a platform provides services to users to create and manage execution of functions in containers. The platform may correspond to the platform system 110 of FIG. 1. A user can interact with a user interface of a platform and develop a function, for example, a function that accesses and downloads resources from an external system. The external system may be a system that is located in another network, e.g., different from the platform's network, and may be accessible with the use of authorization certificates. For example, the external system can be within an internal network on a customer associated with the users, where the customer has a defined tenant account (or multiple accounts) at the platform. The external system can be an on-premises system storing data for the customer.

In some implementations, the platform supports dynamic supply of certificates associated with a tenant account related to a user who initiated execution of a function, or who requests updates to relevant certificates for execution of functions defined for the tenant account.

In some implementations, the platform stores source code related to designed and developed functions of a tenant account (or more accounts) into a database. The database can be an external source code database for the platform, such as for example, the database 180 of FIG. 1.

In some implementations, the platform maintains trusted certificates, for example, at a local storage, where the trusted certificates are organized in bundles relevant for different tenant accounts defined at the platform. The created bundles include trusted certificates that include default operating system certificates and user specific certificates relevant for running functions at the platform. In accordance with the implementations of the present disclosure, the platform can run the functions in containers that are instantiated over images created on the platform as described in relation to FIG. 1.

At 310, an orchestrator, such as the orchestrator 120 of FIG. 1, creates a directory at a local file system at a platform system, such as the platform system 110 of FIG. 1. The platform system hosts a containerized environment for executing functions as a service. The functions as a service are developed and/or provided by users of the platform system and are requested for execution on containers. The orchestrator designates the directory to a tenant account from a plurality of tenant accounts maintained at the platform system. The orchestrator maintains trusted certificates relevant for execution of services by users associated with a particular tenant account.

In some implementations, the orchestrator maintains multiple directories related to corresponding multiple tenant accounts defined on the platform system.

At 320, the platform maintains operating system default certificates relevant for one or more operating systems associated with containerized runtime environments where functions requested by users associated with one or more tenant accounts can be executed. The platform can maintain the operating system default certificates at a local file system, same as the file system where the directory of operation 310 is created.

At 330, the orchestrator of the platform system maintains these user specific trusted certificates at the platform, for example, at the local file system where the operating system default certificates are maintained. The orchestrator receives user specific trusted certificates provided by one or more users of the users associated with the tenant account.

At 340, the orchestrator generates a bundle file for the tenant account that includes the default certificates associated with the operating system running at the containerized runtime environment and the user specific trusted certificates. The bundle file can include those of the default certificates maintained at the platform system that are related to operating systems that run on images where containers implementing functions requested by users of the tenant account would be instantiated.

In some implementations, hash values of the default certificates and the user specific trusted certificates related to the tenant account that are to be included in the bundle file are created and can be included in the bundle file for use when searching for certificates.

At 350, the orchestrator receives a request from a user of the users of a tenant account and based on the request, instantiates a container and runs a function as a service on a container that is instantiated on a pre-prepared image. The orchestrator instantiates a container and mounts the created directory with the created bundle into the container. The container provides a runtime environment for executing the logic of the function, where during the execution of the function, one or more of the certificates from the created directory are used. The created directory that stores the generated bundle is references at the container, for example, as described in relation to FIG. 1. The container can include two folder references—one referencing the default certificates, and one referring to the user specific certificates—as described in FIG. 1, at container A 135.

At 360, the orchestrator receives a new certificate provided by a user of the tenant account.

At 370, the orchestrator updates the directory storing the trusted certificates related to the tenant account. The update of the directory can reflect containers that have the directory mounted and rely on certificates from the directory. In some cases, if an execution of a function at a container relies on a certificate supplied by the mounted directory, the directory would supply the latest up-to-date certificate to be used during the function's execution. In some cases, if a new container is requested to be instantiated for execution of a function (same or different one) related to the tenant account, the orchestrator would mount the directory including the updated content with the new certificate provided by the user at 360.

In some implementations, the update of the directory can include re-generation of the bundle to reflect the addition of the new certificate.

In some implementations, when a new certificate is received at 360, the orchestrator can determine whether this new certificate would change the content of the bundle file with the certificates. For example, the new certificate can be the same as a previously provided user certificate and thus may not change the content of certificates in the bundle. The orchestrator can perform the determination of whether there is a change in the content by relying on comparison of hash values calculated for the certificates maintained in the bundle and the newly provided certificate. In some cases, in response to determining, by the orchestrator, that the received new certificate changes content of the maintained directory, the orchestrator can update the directory to store the new certificate as part of the trusted certificates and to regenerate the bundle file in the directory.

In some implementations, the orchestrator can parse received certificates from one or more users and store data for received certificates from the one or more users. For example, the obtained data from the certificates can include information defining an expiration period of received user specific certificates. The orchestrator can be configured to perform regular checks for the expiration dates and time of obtained certificates of users, and upon determination that the expiration time of a certificate is approaching, for example, the certificate is about to expire, to notify a user of the tenant account for such certificate expiration event.

Embodiments of the subject matter described in this specification include computer systems, apparatus, and computer programs recorded on one or more computer storage devices, each configured to perform the actions of the described methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Example 1 is a computer-implemented method comprising:

maintaining a directory storing trusted certificates related to a tenant account at a platform system, wherein the trusted certificates include user specific trusted certificates relevant for authentication at an external system and default certificates relevant for an operating system running at a containerized runtime environment of the tenant account, wherein the trusted certificates are used during execution of functions requested by one or more users of the tenant account; and executing a function of the functions defined for a tenant account, wherein the function is executed at a container instantiated at the containerized runtime environment of the platform system, wherein the function dynamically uses the trusted certificates maintained at the directory that is mounted at the containerized runtime environment, and wherein at least one of the trusted certificates is used for authentication at the external system.

Example 2 is the method of Example 1, comprising:
based on a request of a user of the one or more users of the tenant account, instantiating the container to run the function, wherein the instantiation comprises:
mounting the directory into the container.

Example 3 is the method of any of the preceding Examples, comprising:
receiving a new certificate provided by a user of the tenant account; and
in response to determining that the received new certificate changes content of the maintained directory, updating the directory storing the trusted certificates related to the tenant account to include the new certificate without rebuilding the container.

Example 4. The method of any of the preceding Examples, wherein maintaining the directory comprises:
creating the directory at a local file system at the platform system hosting the containerized environment for executing functions as a service, wherein the directory is designated to the tenant account from a plurality of tenant accounts maintained at the platform system.

Example 5. The method of any of the preceding Examples, further comprising:
maintaining operating system default certificates relevant for one or more operating systems associated with containerized runtime environments where the functions requested by users associated with one or more tenant account are to be executed;
maintaining the user specific trusted certificates provided by one or more users of the users associated with the tenant account; and
generating a bundle file for the tenant accounts that includes the default certificates associated with the operating system running at the containerized runtime environment and the user specific trusted certificates.

Example 6. The method of Example 5, comprising:
based on the default certificates associated with the operating system running at the containerized runtime environment and the user specific trusted certificates, generating hash values of the default certificates and the user specific trusted certificates related to the tenant account to be included in the bundle file for use when searching for certificates.

Example 7. The method of any of the preceding Examples, wherein the external system is an on-premises system running on a separate network and the running function sends requests to the on-premises system including one or more certificates from the user specific trusted certificates to authorize access to resources provided by the on-premises system.

Example 8. The method of any of the preceding Examples, comprising:
in response to determining that a certificate from the trusted certificates maintained in the directory is about to expire, sending a notification to a user of the tenant account for the determining certificate.

While this specification contains many specific implementation details, these should not be construed as limitations on the scope of any implementation or on the scope of what may be claimed, but rather as descriptions of features that may be specific to particular implementations of the disclosure. Certain features that are described in this specification in the context of separate implementations can also be implemented in combination or in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In certain implementations, multitasking and parallel processing can be advantageous.

What is claimed is:

1. A computer-implemented method comprising:
maintaining a directory storing trusted certificates related to a tenant account at a platform system, wherein the trusted certificates include user specific trusted certificates relevant for authentication at an external system and default certificates relevant for an operating system running at a containerized runtime environment of the tenant account, wherein the trusted certificates are used during execution of functions requested by one or more users of the tenant account; and
executing a function of the functions defined for a tenant account, wherein the function is executed at a container instantiated at the containerized runtime environment of the platform system, wherein the function dynamically uses the trusted certificates maintained at the directory that is mounted at the containerized runtime environment, and wherein at least one of the trusted certificates is used for authentication at the external system.

2. The method of claim 1, comprising:
based on a request of a user of the one or more users of the tenant account, instantiating the container to run the function, wherein the instantiation comprises:
mounting the directory into the container.

3. The method of claim 1, comprising:
receiving a new certificate provided by a user of the tenant account; and
in response to determining that the received new certificate changes content of the maintained directory, updating the directory storing the trusted certificates related to the tenant account to include the new certificate without rebuilding the container.

4. The method of claim 1, wherein maintaining the directory comprises:
creating the directory at a local file system at the platform system hosting the containerized environment for executing functions as a service, wherein the directory is designated to the tenant account from a plurality of tenant accounts maintained at the platform system.

5. The method of claim 1, further comprising:
maintaining operating system default certificates relevant for one or more operating systems associated with containerized runtime environments where the functions requested by users associated with one or more tenant account are to be executed;
maintaining the user specific trusted certificates provided by one or more users of the users associated with the tenant account; and
generating a bundle file for the tenant accounts that includes the default certificates associated with the operating system running at the containerized runtime environment and the user specific trusted certificates.

6. The method of claim 5, comprising:
based on the default certificates associated with the operating system running at the containerized runtime environment and the user specific trusted certificates, generating hash values of the default certificates and the user specific trusted certificates related to the tenant account to be included in the bundle file for use when searching for certificates.

7. The method of claim 1, wherein the external system is an on-premises system running on a separate network and the running function sends requests to the on-premises system including one or more certificates from the user specific trusted certificates to authorize access to resources provided by the on-premises system.

8. The method of claim 1, comprising:
in response to determining that a certificate from the trusted certificates maintained in the directory is about to expire, sending a notification to a user of the tenant account for the determining certificate.

9. A non-transitory, computer-readable medium coupled to one or more processors and having instructions stored thereon which, when executed by the one or more processors, cause the one or more processors to perform operations, the operations comprising:
maintaining a directory storing trusted certificates related to a tenant account at a platform system, wherein the trusted certificates include user specific trusted certificates relevant for authentication at an external system and default certificates relevant for an operating system running at a containerized runtime environment of the tenant account, wherein the trusted certificates are used during execution of functions requested by one or more users of the tenant account; and
executing a function of the functions defined for a tenant account, wherein the function is executed at a container instantiated at the containerized runtime environment of the platform system, wherein the function dynamically uses the trusted certificates maintained at the directory that is mounted at the containerized runtime environment, and wherein at least one of the trusted certificates is used for authentication at the external system.

10. The computer-readable medium of claim 9, comprising instructions stored thereon which, when executed by the one or more processors, cause the one or more processors to perform operations comprising:
based on a request of a user of the one or more users of the tenant account, instantiating the container to run the function, wherein the instantiation comprises:
mounting the directory into the container.

11. The computer-readable medium of claim 9, comprising instructions stored thereon which, when executed by the one or more processors, cause the one or more processors to perform operations comprising:
receiving a new certificate provided by a user of the tenant account; and
in response to determining that the received new certificate changes content of the maintained directory, updating the directory storing the trusted certificates related to the tenant account to include the new certificate without rebuilding the container.

12. The computer-readable medium of claim 9, wherein the instructions to maintain the directory comprises instruction, which when executed by the one or more processors, cause the one or more processor to perform operations comprising:
creating the directory at a local file system at the platform system hosting the containerized environment for executing functions as a service, wherein the directory is designated to the tenant account from a plurality of tenant accounts maintained at the platform system.

13. The computer-readable medium of claim 9, comprising instructions stored thereon which, when executed by the one or more processors, cause the one or more processors to perform operations comprising:
maintaining operating system default certificates relevant for one or more operating systems associated with containerized runtime environments where the functions requested by users associated with one or more tenant account are to be executed;
maintaining the user specific trusted certificates provided by one or more users of the users associated with the tenant account; and
generating a bundle file for the tenant accounts that includes the default certificates associated with the operating system running at the containerized runtime environment and the user specific trusted certificates.

14. The computer-readable medium of claim 9, wherein the external system is an on-premises system running on a separate network and the running function sends requests to the on-premises system including one or more certificates from the user specific trusted certificates to authorize access to resources provided by the on-premises system.

15. The computer-readable medium of claim 9, comprising instructions stored thereon which, when executed by the one or more processors, cause the one or more processors to perform operations comprising:
in response to determining that a certificate from the trusted certificates maintained in the directory is about to expire, sending a notification to a user of the tenant account for the determining certificate.

16. A system comprising
a computing device; and
a computer-readable storage device coupled to the computing device and having instructions stored thereon which, when executed by the computing device, cause the computing device to perform operations, the operations comprising:
  maintaining a directory storing trusted certificates related to a tenant account at a platform system, wherein the trusted certificates include user specific trusted certificates relevant for authentication at an external system and default certificates relevant for an operating system running at a containerized runtime environment of the tenant account, wherein the trusted certificates are used during execution of functions requested by one or more users of the tenant account; and
  executing a function of the functions defined for a tenant account, wherein the function is executed at a container instantiated at the containerized runtime environment of the platform system, wherein the function dynamically uses the trusted certificates maintained at the directory that is mounted at the containerized runtime environment, and wherein at least one of the trusted certificates is used for authentication at the external system.

17. The system of claim 16, wherein the computer-readable storage device comprises instructions stored thereon which, when executed by the one or more processors, cause the one or more processors to perform operations comprising:
  based on a request of a user of the one or more users of the tenant account, instantiating the container to run the function, wherein the instantiation comprises:
    mounting the directory into the container.

18. The system of claim 16, wherein the computer-readable storage device comprises instructions stored thereon which, when executed by the one or more processors, cause the one or more processors to perform operations comprising:
  receiving a new certificate provided by a user of the tenant account; and
  in response to determining that the received new certificate changes content of the maintained directory, updating the directory storing the trusted certificates related to the tenant account to include the new certificate without rebuilding the container.

19. The system of claim 16, wherein the maintaining the directory comprises:
  creating the directory at a local file system at the platform system hosting the containerized environment for executing functions as a service, wherein the directory is designated to the tenant account from a plurality of tenant accounts maintained at the platform system.

20. The system of claim 16, wherein the computer-readable storage device comprises instructions stored thereon which, when executed by the one or more processors, cause the one or more processors to perform operations comprising:
  maintaining operating system default certificates relevant for one or more operating systems associated with containerized runtime environments where the functions requested by users associated with one or more tenant account are to be executed;
  maintaining the user specific trusted certificates provided by one or more users of the users associated with the tenant account; and
  generating a bundle file for the tenant accounts that includes the default certificates associated with the operating system running at the containerized runtime environment and the user specific trusted certificates.

* * * * *